Feb. 19, 1957     E. G. SCHMIDT ET AL     2,781,521
VALVE ACTUATING ATTACHMENT MEANS
Filed Sept. 7, 1954
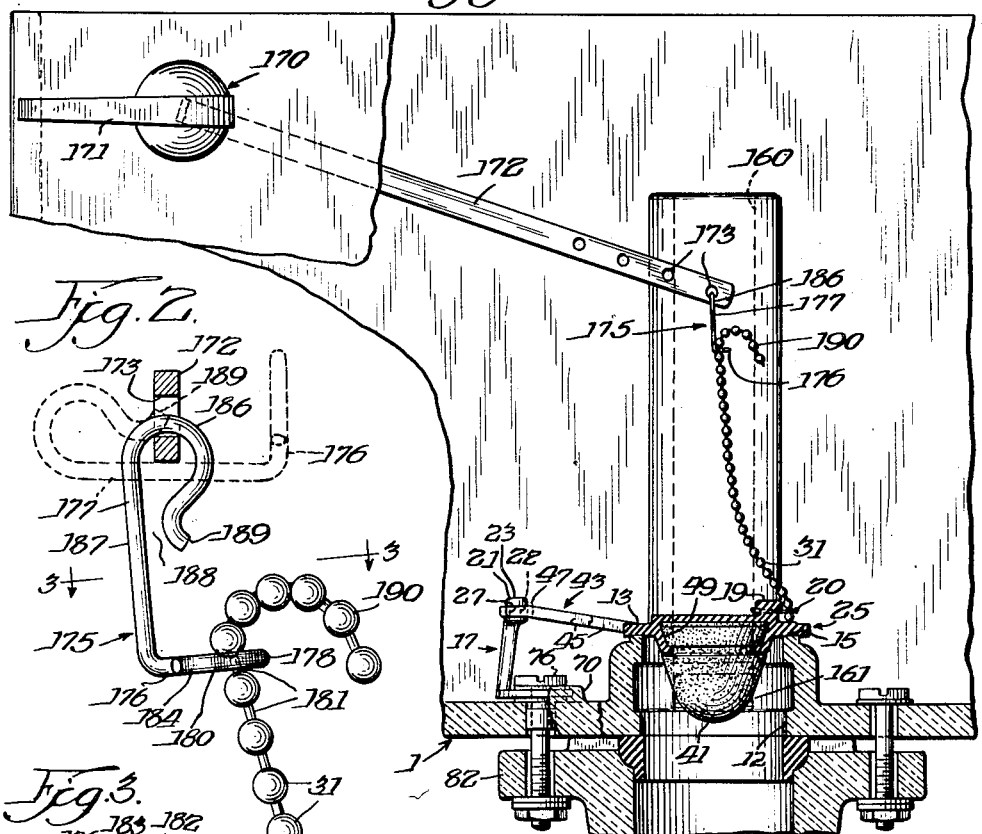
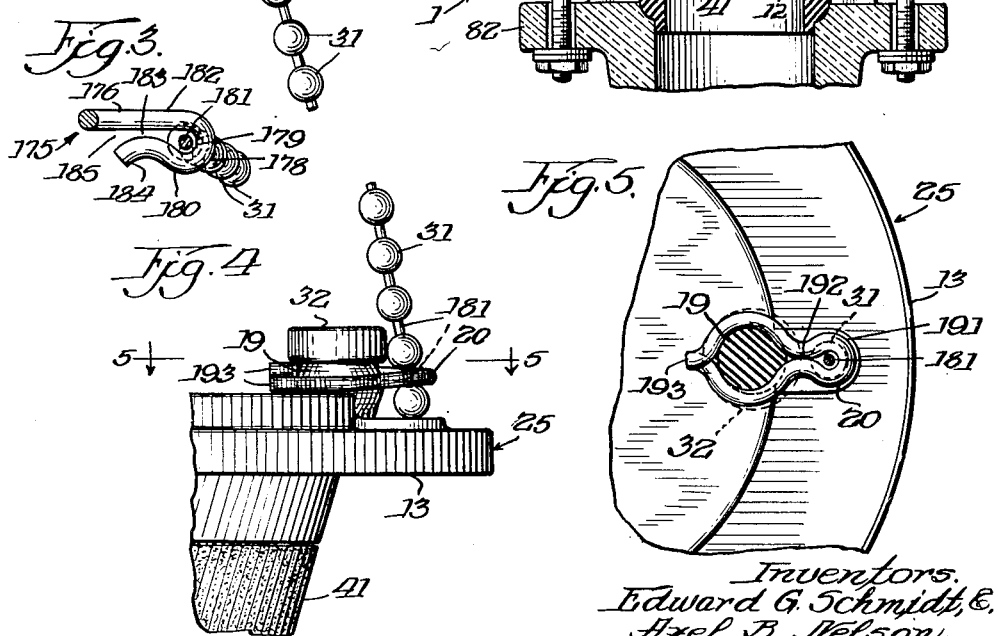
Inventors.
Edward G. Schmidt, &
Axel B. Nelson.
By Joseph O. Lange
Atty.

United States Patent Office 2,781,521
Patented Feb. 19, 1957

2,781,521

VALVE ACTUATING ATTACHMENT MEANS

Edward G. Schmidt, La Grange, and Axel B. Nelson, Chicago, Ill., assignors to Crane Co., Chicago, Ill., a corporation of Illinois Application September 7, 1954, Serial No. 454,554

3 Claims. (Cl. 4—57)

This invention pertains to attachment means for connecting flexible means such as a bead chain to an actuating lever or similar member and is particularly concerned with such connection, for example, in a flush tank for water closets or the like between the flexible chain from the discharge valve and the operating or tripping lever.

The use of a bead chain between the flush valve and actuating lever is not old in the art, but it has been used in one construction or another. For example, in one construction, the flexible chain is secured to the operating lever by being passed through one of the apertures in the side of the lever and then having a small bell-shaped retainer element like those commonly employed on electric light pull chains applied to the portion beyond the aperture between two adjacent balls thereof for preventing the chain from being pulled back through the aperture. Inasmuch as the opening through which the bead chain passes extends horizontally, however, the chain is bent at a 90 degrees angle at the top adjacent its securement to the lever and is therefore stressed in a bent condition during operation which thereby tends to strain and distort the connection between the balls in the bent portion and which produces excessive wear in this portion resulting in failure under continued use.

Another difficulty present in the prior construction and one greatly affecting proper valve operation is that the chain is especially prone to slip through the opening on the return stroke of the lever, especially if the actuation is rather vigorous or the lever is snapped, and then catch on the side of the opening when the chain tightens, thus reducing its length and if several beads have so passed through the lever opening, the closure may be held in a partly open position or fluid tight seating prevented.

Further, the small bell-shaped retainer element previously mentioned is so tiny as to make it most difficult and awkward to manipulate and apply to the chain at the proper location, which must of course be done in the field, without repeatedly dropping and losing it. Disengagement of this element when once applied is even more difficult to accomplish, as when adjustment of chain length or removal or replacement of the closure member is desired. This means of securement is therefore difficult to do, and, further, is to all intents and purposes nonadjustable.

The present invention has therefore for one of its principal objects to provide for a connection between the bead chain and the actuating lever which eliminates all of the difficulties above enumerated and provides many advantages of its own.

Briefly, an object is to provide connecting means between the flexible chain and actuating lever preferably constituting a wire clip member to which the bead chain is quickly and adjustably secured for direct axial pull and the clip member is easily fastened to the lever through one of the apertures thereof.

Other objects and advantages will become apparent in proceeding with the accompanying drawings, in which Fig. 1 shows a fragmentary assembly view of a flush tank employing the present invention.

Fig. 2 is an enlarged view showing the end of the lever arm, with the clip element and bead chain attached and under pull for raising the valve member, as seen from the right in Fig. 1.

Fig. 3 is a section taken approximately on lines 3—3 of Fig. 2.

Fig. 4 is an enlarged front view showing the connection of the bead chain to the closure member.

Fig. 5 is a section taken on line 5—5 of Fig. 4.

In the drawings, the numeral 1 designates a flush tank for a water closet or the like, here shown as a fragmentary portion, the tank being provided with a ported valve seat 15 and integral overflow means 160 in fluid communication with the port 12 at 161. A flapper type closure member 25 is preferably employed which is constructed in accordance with co-pending applications Serial Nos. 401,849 and 431,435, filed January 4, 1954, and May 21, 1954, respectively. Briefly, this member comprises a closure portion 13 for flat seating engagement with the valve seat 15 and a float element 41 depending therefrom, the latter being received and removably secured within a specially constructed cavity or pocket formation 49 in the rubber or resilient closure member. The float element preferably comprises a mass of extremely lightweight inherently impervious sealed cellular material, such as foam polystyrene or foam polyethylene. The closure member is adapted to be swingably mounted and is provided with an extending portion 43 constituting a pair of spaced arms 45 and a cross piece 47 extending between the arms at the rear thereof. The cross piece is provided with a centrally located elongated aperture or slot 27 for reception of a similarly elongated or shaped stem portion 22 of an upstanding post or projection 21 of mounting means 17 for the closure member, preferably constituting a separate member as shown non-rotatably secured to the floor of the tank as by the bolt 76 and positioning lug 70 rising from the floor of the tank. This bolt is also used for securement of the tank to the closet 82 in close coupled relation, the closet being shown as a fragmentary portion. The closure member is mounted on the means 17 by passing the recessed portion over the enlargement 23 and onto the stem in button-on fashion, this portion then being secured for flexure of the spaced arms 45 during the opening and closing movement of the valve member. For a more detailed explanation of this mounting, see co-pending applications, Serial Nos. 397,456 and 455,842, filed December 10, 1953, and September 14, 1954, respectively. The first of the latter applications also discloses pivotal mountings for a flapper member, as does application Serial No. 344,506, filed March 25, 1953, to which attention is also invited.

The closure member of whatever type of mounting and detail of construction is raised from the closed position shown in the drawing by means of a flexible bead chain 31 suitably attached to the front portion of the closure member by means of a securing element 20 constructed of wire or the like, and which extends around vertically disposed upwardly extending circular post portion 19 of the closure member terminating in an enlarged head portion 32. The tank is provided with the usual lever actuator 170 mounted through the front of the tank and comprising the handle 171 and lever 172 provided with a plurality of apertures 173 adjacent the end thereof.

According to the present invention, the bead chain 31 is connected to the lever 172 by means of a spring clip member generally designated 175. This clip member is formed into an attachment portion 176 at the bottom for reception of the bead chain and an upper hook portion 177 adapted to extend through one of the holes or apertures of the lever as shown. In detail, the lower attachment portion extends in a single plane and is formed into a loop 178 with an opening 179 of sufficient size to accommodate the wire connectors 181 between adjacent balls or beads of the chain. The end of the loop is formed to extend in close proximity to the straight inner leg 182 of the lower attachment portion at 183 and then curve outwardly away from the straight portion at the end. The space between the inner leg and the point of closest approach of the outside of the loop at 183 is somewhat smaller than the diameter of the connecting wires 181 between the beads of the chain so as to prevent the passage of this wire through this restricted space without force being applied, so as to spring the loop end outwardly and permit such passage. In mounting, the flared or outwardly curved end 184 of the loop acts to guide and direct the connector between two adjacent beads of the chain toward the restricted space for subsequent application of pressure on the adjacent beads for forcing the connector through the space and into the center of the loop. The chain is detachable from this securement by the reverse process.

The upper part 177 of the clip is formed into a hook 186 extending in a single plane and approaching the upstanding leg 187 of the clip at 188 and from thence it curves outwardly to the end. The restricted space between the straight inner leg and reverse portion of the hook at 188 is at least slightly less than the distance between the rim of any of the apertures 173 to the bottom surface of the lever arm 172. This arrangement affords positive securement of the hook and prevents it from becoming disengaged from the lever bar in the course of valve operation and thus insures attachment at all times. In order to assemble the hook on the lever arm, the former is preferably held in the position indicated in dotted lines in Fig. 2 and so that the flared end 189 of the hook is within the opening 173 of the lower arm 172. Pressure is then applied to the hook in a horizontal direction (towards the right in Fig. 2) to spread the entrance to the hook and force the bottom of the rod into the center of the loop. The hook is then rotated or lowered into the upright position shown. It should be noted that the upper hook portion and lower attachment portion of the clip member lie in planes which are at right angles to each other, the inner straight legs of the hook portion and bead attachment portion respectively also being at right angles to each other. Moreover, the upper or hook portion of the clip member and inner straight leg of the lower attachment portion lie in the same plane. Also, the upper hook and lower straight leg of the attachment portion extend in the same direction, forwardly, the attachment of the bead chain being generally under the connection between the clip member and lever at the top although actually slightly forward of the exact point of connection.

It should also be noted that the bead chain is attached to the clip member for direct axial or straight line pull when the handle 171 is turned and lifting force is applied to the flush valve (see Fig. 2). This is in contradistinction to the arrangement noted in the preamble in which the bead chain was bent at a 90 degree angle at the top where it was connected directly to the lever. The present connection eliminates the excess wear and strained condition leading to unreliable performance and early failure.

Almost indefinite service should also be expected because of the straight line pull of the chain under load. In this connection, it should be noted that the bottom of the chain is also arranged for axial straight line pull, being secured to the projection 19 of the flapper member by means of the wire element 20 which extends horizontally from the projection forming the loop 191 for receiving the connecting wire between two adjacent beads of the chain. This wire is, of course, passed between the sides of the securing element where they approach each other immediately rearwardly of the loop 191 at 192. The element with chain attached is then slipped horizontally onto the projection 19 of the flapper member, the ends 193 of the securing element being squeezed together into the position shown on Figs. 4 and 5 for retention of the element and consequent attachment of the chain to the closure member at the bottom. This lower attachment element therefore provides for the straight line pull of the chain in combination with the upper clip 175 and comprises part of the concept of the invention.

Another feature of the invention is that the bead chain is very easily and conveniently attached to the clip member at the top by simply introducing the portion of the chain between two adjacent beads into the broadened mouth 185 of the lower attachment portion and then applying slight pressure to force the same past the norrow or restricted portion 183 and into retained position within the loop 178 as shown. The outer leg or lower terminal portion 180 is of course adapted to deflect outwardly slightly during this movement of the chain within the loop, springing back to its original position for positive retention of the chain. The bead chain may also be easily disengaged from the clip by applying pressure on the chain in the reverse direction. Another advantage and one of the greatest importance, therefore, is that the chain is readily adjustable to the correct length for proper valve actuation either for initial installation or subsequent adjustment (note the excess chain at 190 for this adjustment). This is definitely not so in the case of the prior arrangement, above described, employing the small bell shaped securing element. This element is most difficult to extract and reapply in an adjusted position. This is even more the case where a second bell shaped element is employed on the opposite side of the lever to the first in an endeavor to prevent the bead stance, the flapper member (lower securing element, bead lever in the course of operation. In the present instance, the flapper member (lower securing element, bead chain and upper clip may be shipped as a unit in assembled relation and after mounting of the closure member, the upper clip can be hooked through the proper opening in the lever arm and the chain slipped off the clip at the bottom and reapplied for the proper chain length, if the length is not initially correct.

Another important feature is that a swivel action is provided between the curved surface of the hook and lever at the top which permits free adjustment or positioning of the clip member in any direction also with the help of the round wire used for the straight line pull of the chain when under load for the raising of the flush valve. This swivel action also provides for different disposition of the clip member for the straight line pull in flush tanks of different sizes and designs and in which the flushing mechanism may vary. It should be noted in this connection that when the chain is pulled taut and the clip shifts slightly into the loaded position as shown in Fig. 2, the line of the force extends through the point of connection between the hook and lever at the top.

It is, therefore, evident that unique means of attachment between the bead chain and actuating lever has been presented which in summary (1) facilitates easier attachment of the chain to the lever, (2) provides for ready field adjustment of the chain to the proper length, either on initial installation or for subsequent adjustment, (3) permits easier dissembly or removal of the closure member as for cleaning or replacement of parts and easier readjustment of the chain to a different position (aperture) on the actuating lever for better throw or lifting limits, (4) provides positive securement of the bead chain at the bottom and of the clip member to the actuating lever at the top, and finally (5) insures straight line axial pull of the bead chain between the clip at the top and the securing element extending from the flapper member at the bottom to decrease excess friction, wear, and distortion of the chain and promote longer, more dependable service, this being assisted by the universal or swivel action between the top of the clip and lever.

Although a swingably mounted valve closure has been illustrated and described, it is not desired to limit the present invention, necessarily, to this kind of valve and indeed, as to the upper clip, this device or form of attachment of a bead chain or other flexible means provided with an enlargement of bead-like form to a lever or other apertured member may have applications other than for valve actuation in a flush tank. Also, the flush tank shown may be provided with a separate ported seat or outlet member instead of the integral china seat illustrated on the drawing.

Inasmuch as the present invention is subject to numerous variations and modifications, the same should therefore be limited only by the appended claims falling within the spirit of the invention.

We claim:

1. In combination with a flush tank for a water closet or the like provided with an outlet and a valve member therefor, a tripping mechanism mounted in the upper part of the tank, the latter mechanism including a lever arm having an aperture therethrough, flexible means such as a cord connected to said valve member for raising the valve member from the closed position, said flexible means having at least one element of enlarged bead-like form, a resilient clip member connecting the flexible means to said lever arm, said clip member consisting of a single piece of wire and comprising an upstanding leg formed into a hook and adapted to receive the marginal portion of the lever arm between the aperture and an outer limit thereof through the restricted opening of the hook and within the interior thereof for securement of the clip member and attached flexible means, said marginal portion of the lever arm being of relatively greater depth than the restricted opening of the hook and the outer leg of the hook being deflectable for the passage of the aforesaid marginal portion through the restricted opening, said wire clip member having a lower portion for attachment of the flexible means, said lower attachment portion being formed into a loop of sufficient size to loosely contain the portion of the flexible means immediately below the enlarged element thereof while not so large as to permit the passage of the enlarged element therethrough when the flexible means is subjected to an axial pull, said loop having an outer deflectable leg for insertion and withdrawal of the portion of the flexible means below the enlarged element thereof between the terminal portion of the outer leg and opposite portion of the loop by the application of transverse force in opposite directions respectively for insertion and withdrawal of the flexible means into and out of the central portion of the loop, said extending leg and hook and the lower attachment portion each extending in single planes substantially at right angles to each other, the loop formation of the lower attachment portion further being disposed at an angle with respect to the upstanding leg from which the lower attachment portion extends, the angle being sufficient to cause the loop formation to extend and to engage said flexible means passing therethrough transversely to a straight line through the central portion of the loop and the center of contact between the hook formation and lever arm at the top whereby to permit the flexible means to assume this straight line substantially throughout the portion under load during tripping of the lever arm and raising of the valve member into the open position for substantially staright line pull of the flexible means during this actuation, said resilient clip member being constructed of round wire and said hook formation being of smooth curvature at the top thereof to permit swiveling of the clip member with respect to said lever arm in any direction to facilitate the substantially straight line pull of the flexible means during actuation of the valve member, said flexible means having at least a second element of enlarged bead-like form adjacent the lower end thereof, said valve member having an upwardly extending portion, a wire element having a portion embracing said upwardly extending portion in substantially fixed relation and including a portion therebeyond formed into a loop of sufficient size to loosely contain the portion of the flexible means immediately above the said second enlarged element thereof while not so large as to permit the passage of the second enlarged element therethrough when the flexible means is subjected to axial pull, said portion of the wire element forming the loop extending substantially horizontally at least when the valve member is in the closed position whereby to effect substantially straight line axial pull of the flexible means along its entire length under load during actuation and in cooperation with the said resilient clip member.

2. In combination with a flush tank for a water closet or the like provided with an outlet and a valve member therefor, a tripping mechanism mounted in the upper part of the tank, the latter mechanism including a lever arm having an aperture therethrough, flexible means such as a cord connected to said valve member for raising the valve member from the closed position, said flexible means having at least one element of enlarged bead-like form, a resilient wire clip member connecting the flexible means to said lever arm, said wire clip member comprising an upstanding leg formed into a hook and adapted to receive the marginal portion of the lever arm between the aperture and an outer limit thereof through the restricted opening of the hook and within the interior thereof for securement of the clip member and attached flexible means, said marginal portion of the lever arm being of relatively greater depth than the restricted opening of the hook and the outer leg of the hook being deflectable for the passage of the aforesaid marginal portion through the restricted opening, said wire clip member having a lower portion for attachment of the flexible means, said lower attachment portion being formed into a loop of sufficient size to loosely contain the portion of the flexible means immediately below the enlarged element thereof while not so large as to permit the passage of the enlarged element therethrough when the flexible means is subjected to an axial pull, said loop having an outer deflectable leg for insertion and withdrawal of the portion of the flexible means below the enlarged element thereof between the terminal portion of the outer leg and opposite portion of the loop by the application of transverse force in opposite directions respectively for insertion and withdrawal of the flexible means into and out of the central portion of the loop, said extending leg and hook and the lower attachment portion each extending in single planes substantially at right angles to each other, the loop formation of the lower attachment portion further being disposed at an angle with respect to the upstanding leg from which the lower attachment portion extends, the angle being sufficient to cause the loop formation to extend and to engage said flexible means passing therethrough transversely to a straight line through the central portion of the loop and the center of contact between the hook formation and lever arm at the top whereby to permit the flexible means to assume this straight line substantially throughout the portion under load during tripping of the lever arm and raising of the valve member into the open position for substantially straight line pull of the flexible means during this actuation, said flexible means having at least a second element of enlarged bead-like form adjacent the lower end thereof, means connecting the flexible means to the valve member comprising a wire element secured to the valve member and having a portion formed into a loop of sufficient size to loosely contain the portion of the flexible means immediately above said second enlarged element thereof while not so large as to permit the passage of the second enlarged element therethrough when the flexible means is subjected to axial pull, said portion of the wire element forming the loop extending transversely of the flexible means at least when the valve member is in the closed position whereby to effect substantially straight line axial pull of the flexible means along the entire length under load during actuation and in cooperation with the said resilient clip member.

3. The subject matter of claim 2, said resilient clip member being constructed of round wire and said hook formation being of smooth curvature at the top thereof to permit swiveling of the clip member with respect to said lever arm in any direction to facilitate the substantially straight line pull of the flexible means during actuation of the valve member.

References Cited in the file of this patent

UNITED STATES PATENTS

| | | |
|---|---|---|
| 173,694 | Upham | Feb. 15, 1876 |
| 1,667,990 | Rogers | May 1, 1928 |
| 2,046,888 | Watt | July 7, 1936 |
| 2,142,393 | Halteman | Jan. 3, 1939 |
| 2,304,512 | Stanley | Dec. 8, 1942 |
| 2,512,924 | Dysart | June 27, 1950 |
| 2,599,940 | Rickena | June 10, 1952 |

FOREIGN PATENTS

| | | |
|---|---|---|
| 376,656 | Germany | June 2, 1923 |